United States Patent
Honjo

(10) Patent No.: US 12,108,148 B2
(45) Date of Patent: Oct. 1, 2024

(54) IMAGE PICKUP SIGNAL PROCESSING APPARATUS, IMAGE PICKUP SIGNAL PROCESSING METHOD, AND STORAGE MEDIUM

(71) Applicant: CANON KABUSHIKI KAISHA, Tokyo (JP)

(72) Inventor: Wataru Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 17/852,696

(22) Filed: Jun. 29, 2022

(65) Prior Publication Data
US 2023/0007174 A1      Jan. 5, 2023

(30) Foreign Application Priority Data

Jul. 5, 2021   (JP) ................. 2021-111625
Nov. 29, 2021  (JP) ................. 2021-192826

(51) Int. Cl.
*H04N 23/667*   (2023.01)
*H04N 23/661*   (2023.01)

(52) U.S. Cl.
CPC ......... *H04N 23/667* (2023.01); *H04N 23/661* (2023.01)

(58) Field of Classification Search
CPC .. H04N 23/667; H04N 23/661; H04N 23/695; H04N 23/60
See application file for complete search history.

(56) References Cited

U.S. PATENT DOCUMENTS 9,742,999 B2     8/2017 Iwasaki
2014/0376875 A1* 12/2014 Iwasaki ............... H04N 23/695
                                                386/224

FOREIGN PATENT DOCUMENTS

JP      2014-179879 A     9/2014

OTHER PUBLICATIONS

ONVIF(TM) Recording Control Service Specification Version 17.Dec. 12, 2017 (Year: 2017).*
ONVIF Specification Map http://www.onvif.org/specs/DocMap. html Cited in Specification in paragraphs [0002][0003][0004][0005][0048][0050][0058][0062][0063].

* cited by examiner

*Primary Examiner* — Timothy J Henn
(74) *Attorney, Agent, or Firm* — Cowan, Liebowitz & Latman, P.C.

(57) ABSTRACT

An image pickup signal processing apparatus includes a video processing unit for processing an image pickup signal acquired from an image pickup unit based on a predetermined video setting to generate video data, a recording unit for recording the video data based on a predetermined video recording setting, a control unit for performing recording of the video data by using a first recording job that corresponds to the video setting and the video recording setting, and a receiving unit for receiving a change request to change the video setting, wherein the control unit performs the recording of the video data by using a second recording job that corresponds to the video setting that has been changed based on the change request, which is different from the first recording job, based on the change request received by the receiving unit.

17 Claims, 11 Drawing Sheets

IMAGE PICKUP SIGNAL PROCESSING APPARATUS, IMAGE PICKUP SIGNAL PROCESSING METHOD, AND STORAGE MEDIUM

BACKGROUND OF THE INVENTION

Field of the Invention

The present invention relates to an image pickup signal processing apparatus, an image pickup signal processing method, a storage medium, and the like that can receive a change request to change video settings.

Description of the Related Art

Conventionally, some monitoring cameras and the like can record video images on a recording media such as an SD card on the camera side. Additionally, in the Open Network Video Interface Forum (hereinafter, referred to as "ONVIF"), which is a common standard for connecting a monitoring camera and the like to a client apparatus for video image reception, setting values and commands related to the video recording function are standardized.

Furthermore, in the ONVIF standard, the definition of a Profile that includes a set value group related to image pickup such as a VideoEncoderConfiguration that indicates a video encoding method is provided as settings related to video recording. A RecordingConfiguration that indicates the video image recording settings and a RecordingJob that is a video recording management job including settings for a recording state and the like, are also defined.

The RecordingJob is created based on the Profile and the RecordingConfiguration, the recording state is set to Active, and thereby video recording can be started (ONVIF Specification (http://www.onvif.org/specs/DocMap.html))

Additionally, in the ONVIF standard, the functions of searching and reproducing recorded video images are also standardized and it is possible to search for and reproduce videos images that were recorded using a user's desired recording setting by specifying the RecordingConfiguration.

Accordingly, in general, the encoding method that can be used for the RecordingConfiguration is uniquely determined. In this case, the user needs to create a RecordingJob based on a Profile including the encoding method settings that can be used for the RecordingConfiguration and then start recording.

However, since the Profile is a set value group that is used in video distribution in addition to video recording, it is possible to change the encoding method halfway. When the encoding method of the Profile that is being used in video recording is changed, an inconsistency occurs between the settings of the RecordingConfiguration and the Profile that is included in the Job, resulting in a drawback in which recording cannot be continued.

In contrast, for example, Japanese Patent Application Laid-Open No. 2014-179879 discloses a configuration in which when a job is recording video images and a change related to a video setting is received, the change cannot be received and an error is returned.

It is possible to return an error without receiving a setting change in relation to setting changes that cause inconsistencies, as is disclosed in Japanese Patent Application Laid-Open No. 2014-179879. However, if an error is returned when the inconsistency occurs, the video settings cannot be changed at all during recording, and it contrarily becomes difficult for the user to use.

SUMMARY OF THE INVENTION

An object of the present invention is to provide an image pickup signal processing apparatus that can record video data by using another recording job even if the recording of the video data by the recording job cannot be performed due to a change in video settings in a recording job.

One aspect of the present invention includes an image pickup signal processing apparatus comprising: at least one processor or circuit configured to function as: a video processing unit configured to process an image pickup signal acquired from an image pickup unit based on a predetermined video setting to generate video data; a recording unit configured to record the video data based on a predetermined video recording setting; a control unit configured to perform recording of the video data by a first recording job that corresponds to the video setting and the video recording setting; and a receiving unit configured to receive a change request for the video setting, wherein the control unit is configured to perform the recording of the video data by using a second recording job that corresponds to the video setting that has been changed based on the change request, which is different from the first recording job, based on the change request received by the receiving unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

In the embodiments, descriptions will be given of an example of a network camera such as a monitoring camera serving as an image pickup signal processing apparatus. However, the image pickup signal processing apparatus includes electronic devices or the like such as a digital still camera, a digital movie camera, a smartphone, a tablet computer, a general-purpose computer, an in-vehicle camera, a drone, a robot, or the like.

First Embodiment

Figure 1:
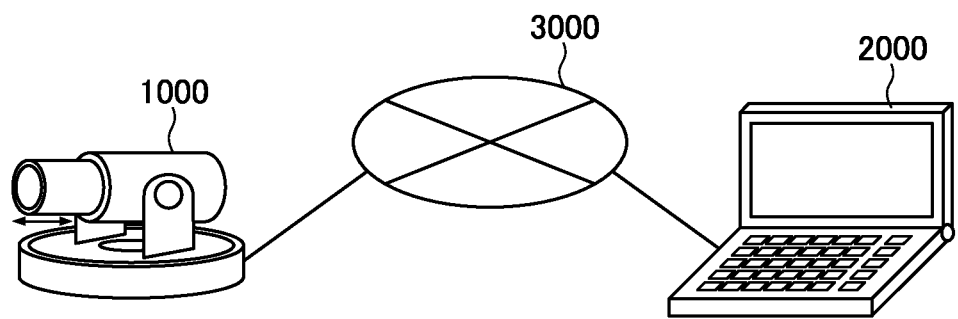
FIG. 1 is a configurational diagram of an image pickup system according to the first embodiment of the present invention.

An image pickup signal processing apparatus according to the first embodiment of the present invention will now be described with reference to FIGS. 1 to 7. FIG. 1 is a configurational diagram of an image pickup system according to the first embodiment of the present invention, in which the reference numeral 1000 denotes a network camera, for example, a monitoring camera serving as an image pickup signal processing apparatus, and the reference numeral 2000 denotes a client device showing an external device in the present embodiment.

The network camera 1000 and the client apparatus 2000 are communicably connected to each other over a network 3000. The client apparatus 2000 transmits various types of control commands such as video settings and the like to the network camera 1000. The network camera 1000 transmits responses to the commands, and video signals to the client apparatus 2000.

Figure 2:
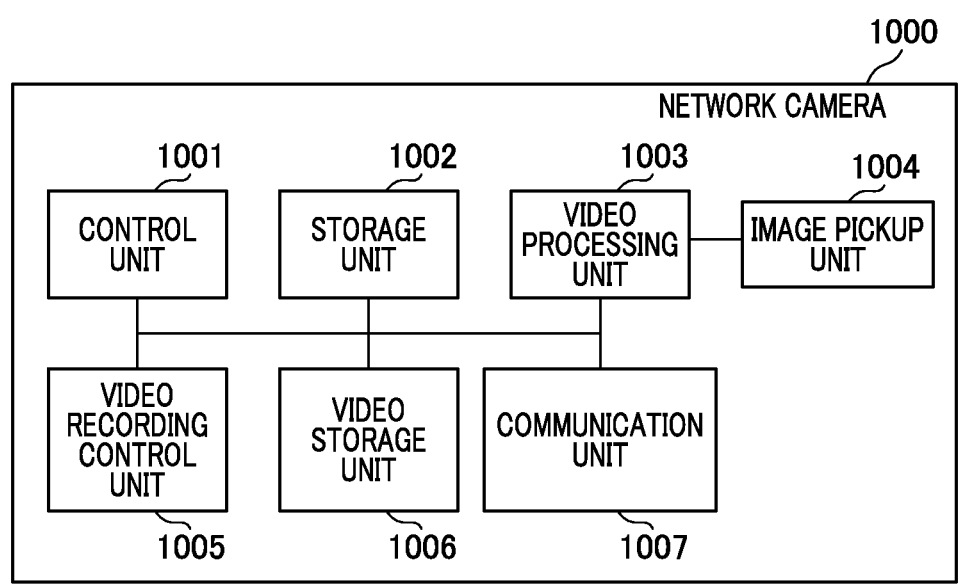
FIG. 2 is a functional block diagram showing a configuration of a network camera 1000 of the first embodiment.

FIG. 2 is a functional block diagram showing a configuration of the network camera 1000 according to the first embodiment. A part of the functional blocks shown in FIG. 2 may be realized by causing a computer that is included in the network camera 1000 serving as an image pickup signal processing apparatus to execute a computer program that is stored in a memory serving as a storage medium.

Alternatively, a part of or all of the functional blocks shown in FIG. 2 may be realized by hardware. A dedicated circuit (ASIC), a processor (reconfigurable processor, DSP), or the like can be used as the hardware.

Additionally, each of the functional blocks shown in FIG. 2 does not necessarily have to be incorporated in the same casing, and the network camera 1000 serving as the image pickup signal processing apparatus may be configured by separate devices connected to each other via signal paths.

In FIG. 2, the reference numeral 1001 denotes a control unit that controls the entire information processing apparatus. The control unit 1001 has, for example, a CPU serving as a computer and controls the entire network camera.

The reference numeral 1002 denotes a storage unit serving as a storage medium that has data storage regions such as a storage region of a computer program executed by the control unit 1001, a work region where a program is being executed, and a temporary storage region for video data generated by a video processing unit 1003 to be described below.

The reference numeral 1003 denotes a video processing unit, and the reference numeral 1004 denotes an image pickup unit. The video processing unit 1003 generates digital video data based on an analog image pickup signal acquired from the image pickup unit 1004. Subsequently, the digital video data are processed based on predetermined video settings (settings such as an encoding method, a frame rate, and a resolution), and a video processing step for output to the storage unit 1002 or the like is performed.

The image pickup unit 1004 is configured by an image pickup optical system and an image pickup device, for example, a CMOS image sensor, and performs photoelectrical conversion on an object image formed by the image pickup optical system by an image pickup device, and outputs an analog image pickup signal. Furthermore, the image pickup unit 1004 has a panning, tilting, and zooming mechanism for controlling, for example, an image pickup direction and a field angle of the image pickup optical system.

The reference numeral 1005 denotes a video recording control unit and the reference numeral 1006 denotes a video storage unit. The video recording control unit 1005 performs processing on the video data that is generated by the video processing unit 1003 and records the video data that has been stored in the storage unit 1002 in the video storage unit 1006 based on a predetermined video recording setting. That is, the video recording control unit 1005 records the video data based on a predetermined video recording setting.

The video storage unit 1006 is used as a storage region when the video image that has been picked up is temporarily stored, and may be an internal disk for recording, for example, an HDD or an SSD. Alternatively, it may be an external memory that is connected via an interface.

The reference numeral 1007 denotes a communication unit that is used for receiving the changes to each type of setting value and receiving various commands from the client apparatus 2000 via the network 3000. That is, the communication unit 1007 functions as a receiving unit that performs a receiving step of receiving a change request for a video setting. The communication unit 1007 is also used for transmitting responses to each command and for transmitting video data and the like that are stored in the storage unit 1002 and the video storage unit 1006 to the client apparatus 2000 and the like.

Although an example of the configuration of the network camera 1000 has been described above with reference to FIG. 2, the functional blocks shown in FIG. 2 are an example of a camera suitable for use as the image pickup signal processing apparatus in the present embodiment, and the present invention is not limited thereto. For example, an audio input unit, an audio output unit, a display unit, and the like may be further provided.

Figure 3:
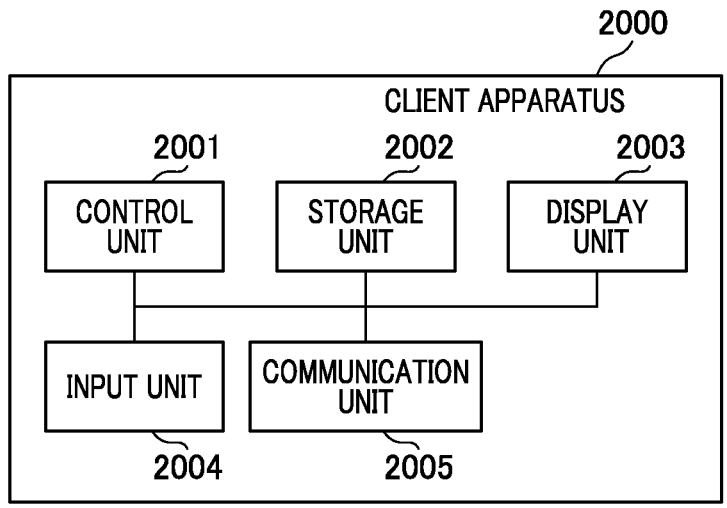
FIG. 3 is a functional block diagram showing a configurational example of a client apparatus 2000 of the first embodiment.

FIG. 3 is a functional block diagram showing an example of a configuration of the client apparatus 2000 of the first embodiment. The reference numeral 2001 denotes a control unit that has, for example, a CPU serving as a computer and controls the entire client apparatus 2000.

The reference numeral 2002 denotes a storage unit, which is mainly used as a storage region of a computer program executed by the control unit 2001, a work region where a program is being executed, and a storage region for data for information about a connectable camera that exists on the network 3000.

The reference numeral 2003 denotes a display unit that is configured by, for example, an LCD (liquid crystal display), an organic EL display, and the like and displays various setting screens, video data received from the network camera 1000, various messages, and the like to the user of the client apparatus 2000.

The reference numeral 2004 denotes an input unit that includes, for example, an operation button, a cross key, a touch panel, and a mouse, and transmits the contents of the operations performed by the user to the control unit 2001.

The reference numeral 2005 denotes a communication unit that is used for transmitting various change commands, such as changes to the image pickup region, to the network camera 1000 via the network 3000. The communication unit 2005 is also used for receiving responses to various change commands and video data streams from the network camera 1000.

An example of the internal configuration of the client apparatus 2000 has been described above with reference to FIG. 3. However, the functional blocks shown in FIG. 3 illustrate an example of the client apparatus 2000 serving as an information processing apparatus and may further include functional blocks such as an image analysis processing unit and a video storage unit.

Figure 4:
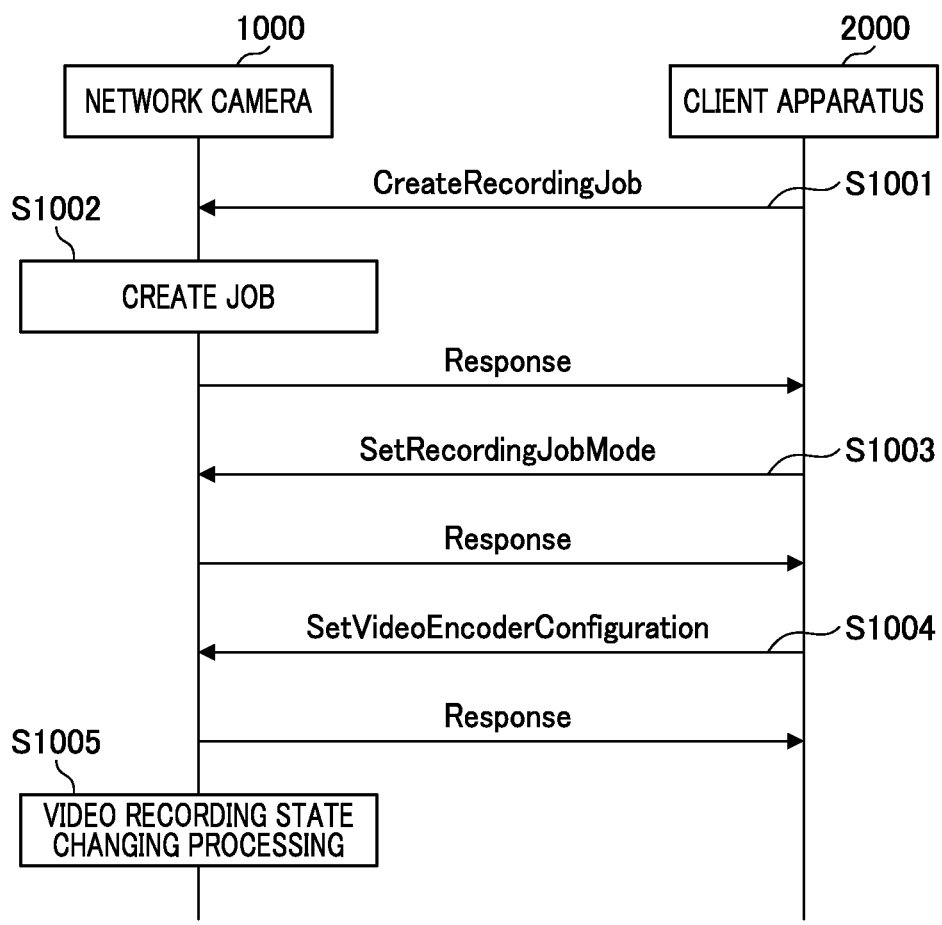
FIG. 4 is a sequence diagram showing a video recording and video setting changing method according the first embodiment.

Next, FIG. 4 is a sequence diagram illustrating the video recording and video setting changing method according to the first embodiment, and a video recording and video setting changing method that uses commands conforming to the ONVIF standard according to the first embodiment will be described with reference to FIG. 4.

Note that the processes shown in FIG. 4 to FIG. 9 are performed by executing computer programs stored in the storage unit by the respective computers in the control unit 1001 of the network camera 1000 and the control unit 2001 of the client apparatus 2000.

Step S1001 is a CreateRecordingJob command conforming to the ONVIF standard. The CreateRecordingJob command is a command for instructing the creation of a RecordingJob, which is a recording job for recording conforming to the ONVIF standard.

The RecordingJob includes a Profile that is a set value group indicating video settings, a RecordingConfiguration that is a video recording setting related to video recording, and a recording state.

Figure 5:
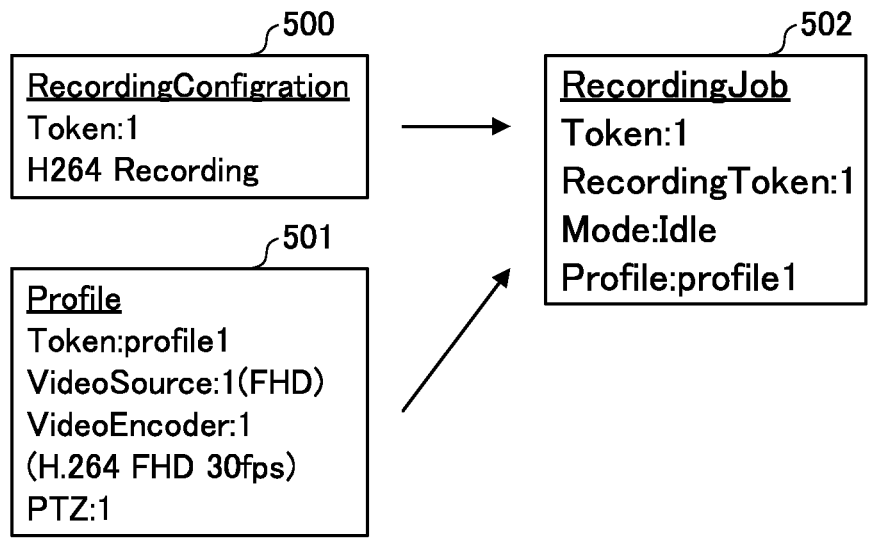
FIG. 5 illustrates a creation method for a recording job in step S1002.

FIG. 5 illustrates a creation method for the recording job in step S1002. Upon receiving the CreateRecordingJob command in step S1001, the network camera 1000 receives a command including the identifier for the RecordingConfiguration and the identifier for the Profile from the client apparatus 2000.

The reference numeral 500 in FIG. 5 denotes an example of the command including the identifier of the RecordingConfiguration, which serves as a video recording setting received from the client apparatus 2000. Here, the RecordingConfiguration includes a Description in which an encoding method (Encoding) that can be used in at least video recording is described.

The reference numeral 501 in FIG. 5 denotes an example of the command including the identifier for the Profile, which serves as video settings received from the client apparatus 2000. The Profile includes settings related to at least one of an encoding method, a frame rate, a resolution, and the like, which will be described below.

The control unit 1001 of the network camera 1000 confirms whether or not, for example, H264, which is an encoding method by which recording can be performed in the specified Recording Configuration, matches the specification of the VideoEncoder, which is an encoding method that is included in the Profile (for example, H264 FHD 30 fps).

If the match is confirmed, a RecordingJob (first recording job) in which the identifier for the specified RecordingConfiguration is associated with the identifier for the Profile is created as shown in 502 in FIG. 5. That is, the recording of the video data is performed by the first recording job that corresponds to the video settings and the video recording settings.

At that time, the "Mode", which shows the operating state, is set to "Idle". At this time, in step S1002, a recording job generating step for generating a recording job by associating the video settings with the video recording settings is performed. Subsequently, the success or failure of the command is transmitted to the client apparatus 2000 to serve as a "Response".

In step S1003, the client apparatus 2000 transmits a SetRecordingJobMode command conforming to the ONVIF standard to the network camera 1000. The SetRecordingJobMode command is a command for starting and stopping video recording.

Upon receipt of the SetRecordingJobMode command, the network camera 1000 performs the recording control based on a value of the Mode, which is a parameter indicating a recording state that is included in the command.

When the Mode is set to "Active", which indicates a state in which recording is in progress, the control unit 1001 of the network camera 1000 changes the Mode of the RecordingJob from Idle, which indicates a stopped state, to Active, and starts a video recording step.

That is, the recording of the video data starts based on the first recording job that is generated in the recording job generating step. Subsequently, the success or failure of the command is transmitted to the client apparatus 2000, as a Response.

Subsequently, in step S1004, it is assumed that the client apparatus 2000 has transmitted a SetVideoEncoderConfiguration command conforming to the ONVIF standard to the network camera 1000. That is, it is assumed that, in step S1004, a change request for the video settings has been performed while the video data are being recorded based on the first recording job that has been generated in the recording job generating step.

Here, the SetVideoEncoderConfiguration command is a command for changing the VideoEncorderConfiguration that is included in the Profile conforming to the ONVIF standard.

The VideoEncorderConfiguration includes settings related to at least one of an encoding method, a frame rate, a resolution, and the like, and functions as a video setting when video data are generated in the video processing unit 1003.

Upon receiving the above command, the network camera 1000 changes the settings according to the parameter included in the command. Subsequently, the success or failure of the command is transmitted to the client apparatus 2000, as a Response.

Step S1005 is a process for changing the video recording state if the video recording cannot be continued due to the occurrence of an inconsistency caused by changing a video setting. Specifically, step S1005 is a process (control step) for changing the video recording state in a case in which a change request for a video setting is performed, an inconsistency occurs between the video recording settings in the first recording job and the video settings in response to the change request, and the recording cannot be continued.

Figure 6:
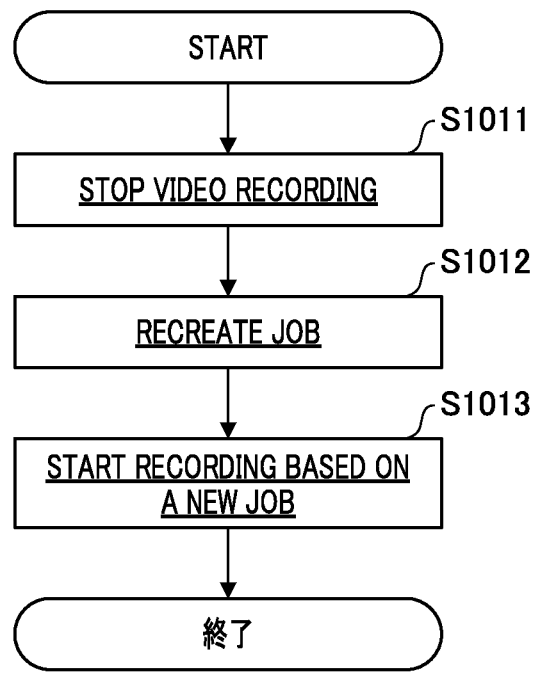
FIG. 6 is a flowchart showing the video recording state changing processing in step S1005.
Figure 7:
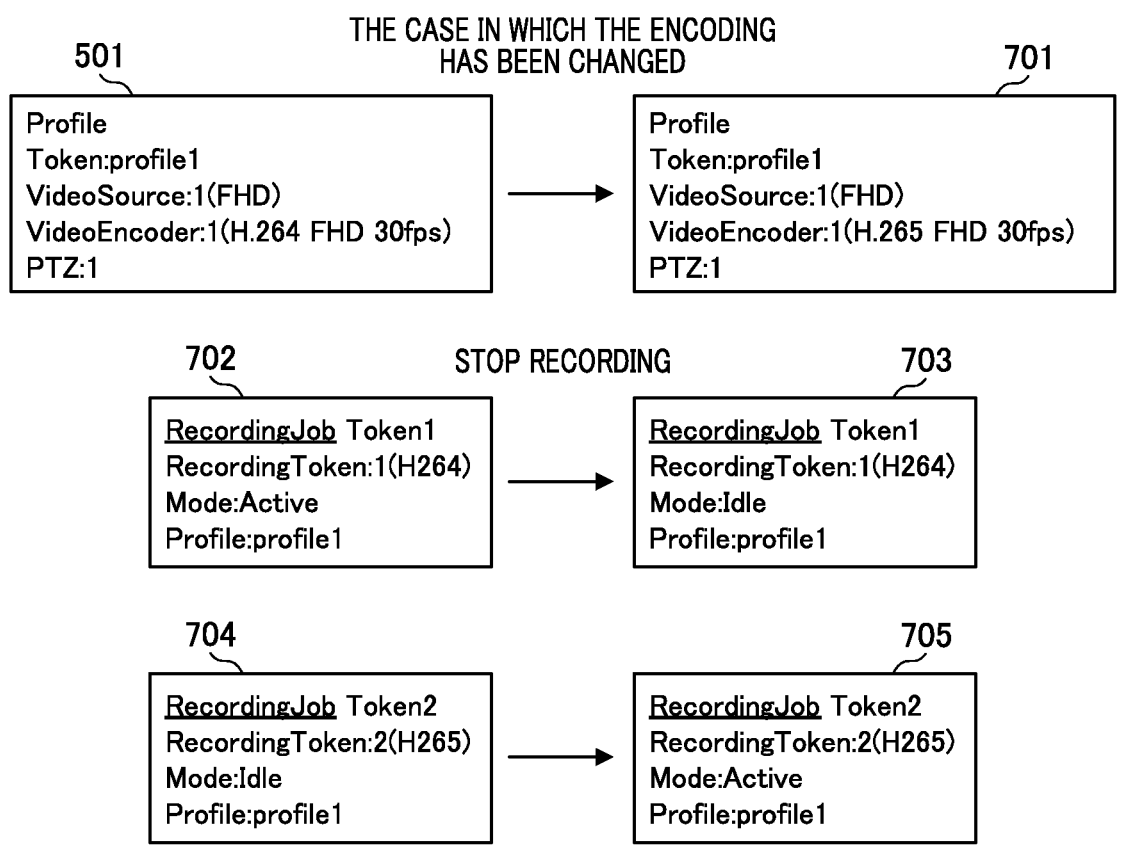
FIG. 7 is a diagram for explaining the flow of FIG. 6.

FIG. 6 is a flowchart showing the video recording state changing processing in step S1005. FIG. 7 is a diagram for explaining the flow in FIG. 6. Step S1011 is a process for stopping video recording based on the first recording job.

It is assumed that, in step S1004, a video setting is changed by a SetVideoEncoderConfiguration command, and an inconsistency, for example, a difference in encoded information between the RecordingConfiguration and the Profile occurs. That is, it is assumed that an inconsistency occurs between the video recording setting in the first recording job and the video setting in response to the change request, thereby causing a situation in which recording cannot be continued.

Specifically, in step S1004, it is assumed that the encoding method in the Profile shown in 501 in FIG. 5 is changed to, for example, H.265 as shown in 701 in FIG. 7, as the result of a video setting change performed by a SetVideoEncoderConfiguration command.

That is, when the change request is a request to change the encoding method included in the video settings to another encoding method, the video recording based on the first recording job is stopped because the encoding method is different from H264, which is the encoding method in the first recording job. Subsequently, the Mode that is included in the first RecordingJob shown in 702 in FIG. 7 is set to Idle as shown in 703 in FIG. 7.

Subsequently, the recording job is created again as in step S1012. That is, a second recording job (RecordingJob) that is different from the first recording job is created by using a RecordingConfiguration that is consistent with the Profile included in the first recording job that was stopped. At that time, a new RecordingJob in which the encoded information for the RecordingConfiguration is consistent with the encoded information for the Profile is created as shown in 704 in FIG. 7.

That is, the second RecordingJob is created after changing the encoding method of the RecordingConfiguration to H.265. Thus, in the present embodiment, the second recording job is created by associating video recording settings that are consistent with the video settings in response to the change request with the video settings in response to the change request.

Step S1013 is a process for starting video recording by using the second recording job created in step S1012. Video recording starts based on the settings that are included in the created second recording job (RecordingJob), and the Mode that is included in the second recording job (RecordingJob) is changed from Idle to Active as shown in 705 in FIG. 7. Thus, the second recording job is created in response to the stopping of the recording based on the first recording job, recording then starts based on the second recording job, and the recording operation is continued.

In this context, the control unit 1001 may create the second recording job before the recording based on the first recording job stops. Thus, in the first embodiment, a second recording job that corresponds to the video setting that has been changed based on the change request and that is different from the first recording job is generated based on the change request received by the receiving unit, and the recording of the video data is performed by using the second recording job.

Thus, the video recording continuing method for when a video setting is changed according to the first embodiment has been described with reference to FIGS. 4 to 7. However, in step S1012, video recording may be started again by using a different job (for example, a default RecordingJob) that has a consistent encoding method and the like, which is stored (prepared) in advance, instead of performing the recreation.

As is described above, in the first embodiment, if an inconsistency occurs in the video recording settings as the result of changing the video settings during video recording, the video recording is re-started using a different RecordingJob with consistent video settings. Consequently, it is possible to continue recording even if a video setting change that causes an inconsistency is performed.

Second Embodiment

Next, an image pickup signal processing apparatus according to the second embodiment of the present invention will be described with reference to FIGS. 1 to 5 and FIGS. 8 and 9.

Figure 9:
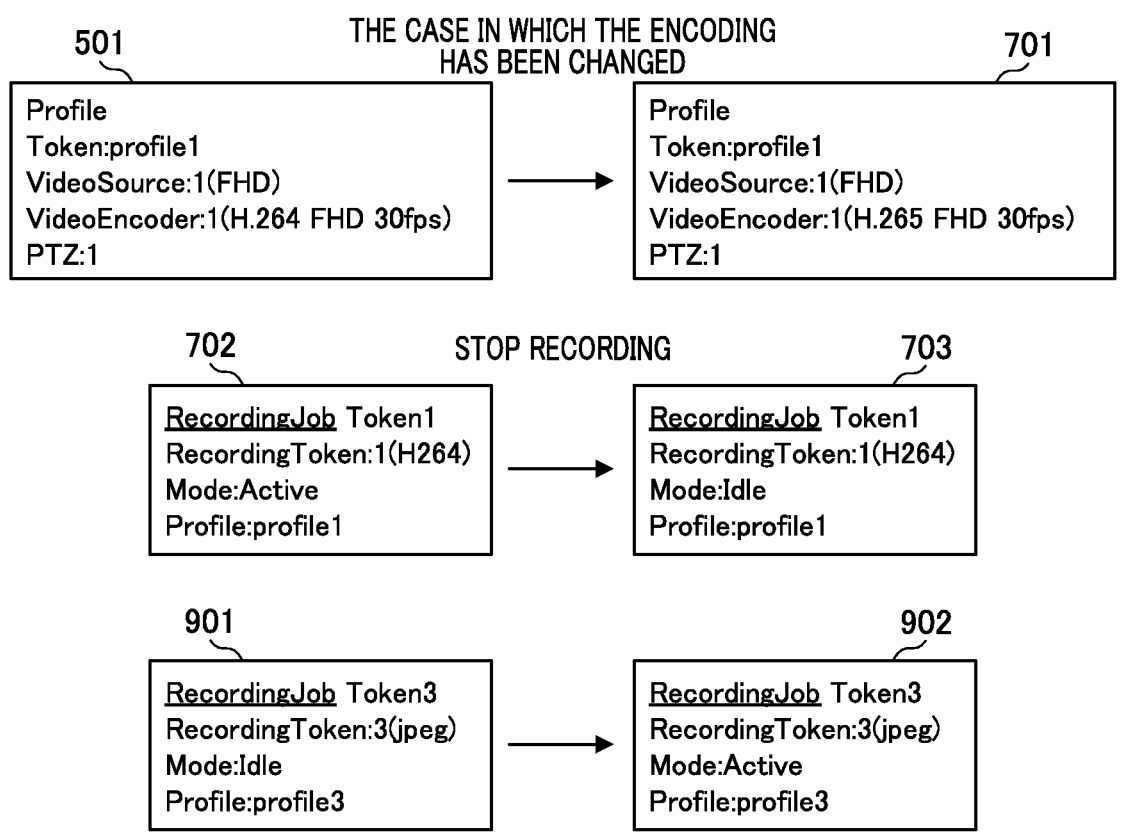
FIG. 9 is a diagram for explaining the flow of FIG. 8.

Since the configurations and the job creation method in FIGS. 1 to 5 are the same as those in the first embodiment, descriptions thereof will be omitted. In FIG. 9, since the same reference numerals as those in FIG. 7 denote the same components, descriptions thereof will be omitted.

Figure 8:
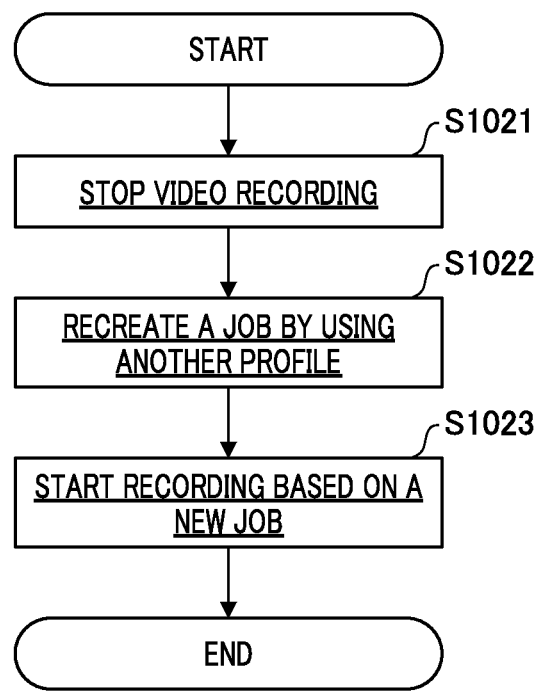
FIG. 8 is a flowchart showing the video recording state changing processing according to the second embodiment of the present invention.

FIG. 8 is a flowchart showing the video recording state changing processing according to the second embodiment of the present invention and FIG. 9 is a diagram for explaining the flow in FIG. 8. Step S1021 is a process for stopping the video recording, and, in step S1004 in FIG. 4, it is assumed that the video setting changes shown in 701 in FIG. 9 (FIG. 7) have been performed by the SetVideoEncoderConfiguration command.

Subsequently, it is assumed that an inconsistency in which, for example, the encoded information between the RecordingConfiguration and the Profile is different, occurs. In that case, the stopping of the video recording is performed as in step S1011 in FIG. 6, and the Mode that is included in the first recording job (RecordingJob) is set to Idle as shown in 702 to 703 in FIG. 9 (FIG. 7).

Step S1022 is a process for recreating a job. A new Job (second recording Job) is created by using a Profile that is different from the Profile being included in the stopped Job and a RecordingConfiguration.

For example, a Profile for which the encoding method cannot (or is difficult to) be changed is prepared in advance by the SetVideoEncoderConfiguration and this Profile is used. That is, for example, a second recording job in which the JPEG format is used as the encoding method is created as shown in 901 in FIG. 9.

Specifically, in the present embodiment, the second recording job is created by associating the second video setting, which is different from the first video setting, in the change request with the video recording setting that is consistent with the second video settings.

In step S1023, video recording starts based on the settings that are included in the second recording job (RecordingJob) shown in 901 in FIG. 9 created in step S1022. Additionally, the Mode that is included in the second recording job (RecordingJob) is changed from Idle as shown in 901 in FIG. 9 to Active as shown in 902 in FIG. 9.

Thus, the video recording continuing method for when a video setting is changed according to the second embodiment has been described with reference to FIGS. 8 and 9. However, for example, in step S1012, video recording may be restarted by using a different job (for example, a RecordingJob that uses a default Profile) that has a consistent encoding method and the like, which is stored (prepared) in advance, instead of performing recreation, as in the first embodiment.

Alternatively, the examples of a method for selecting a different Profile used in step S1022 may include preferentially selecting a different Profile in which the video settings that were changed in step S1003 match the settings such as the resolution and the frame rate.

As was described above, in the second embodiment, if an inconsistency occurs in the recording settings due to a change in the video settings, the creation of a recording job and the restarting of recording are performed by using a Profile that is different from the Profile that had been used up until then in recording.

Consequently, it is possible to continue recording even if a video setting change that causes an inconsistency is performed. Additionally, it is possible to reduce the probability of the occurrence of an inconsistency by restarting recording by using a Profile in which a video setting change is less likely to be caused, even for the subsequent changes to the video settings.

Third Embodiment

Next, an image pickup signal processing apparatus according to the third embodiment of the present invention will be described with reference to FIGS. 1 to 5 and FIGS. 10 to 14. In the third embodiment, when the second recording job corresponding to the video setting that has been changed based on the change request is stored in the storage unit, the second recording job is used.

Since the configurations and the job creation method in FIGS. 1 to 5 are the same as those in the first embodiment, descriptions thereof will be omitted. Additionally, in FIG. 12, since the reference numerals that are the same as those in FIG. 7 denote the same components, descriptions thereof will be omitted.

Figure 10:
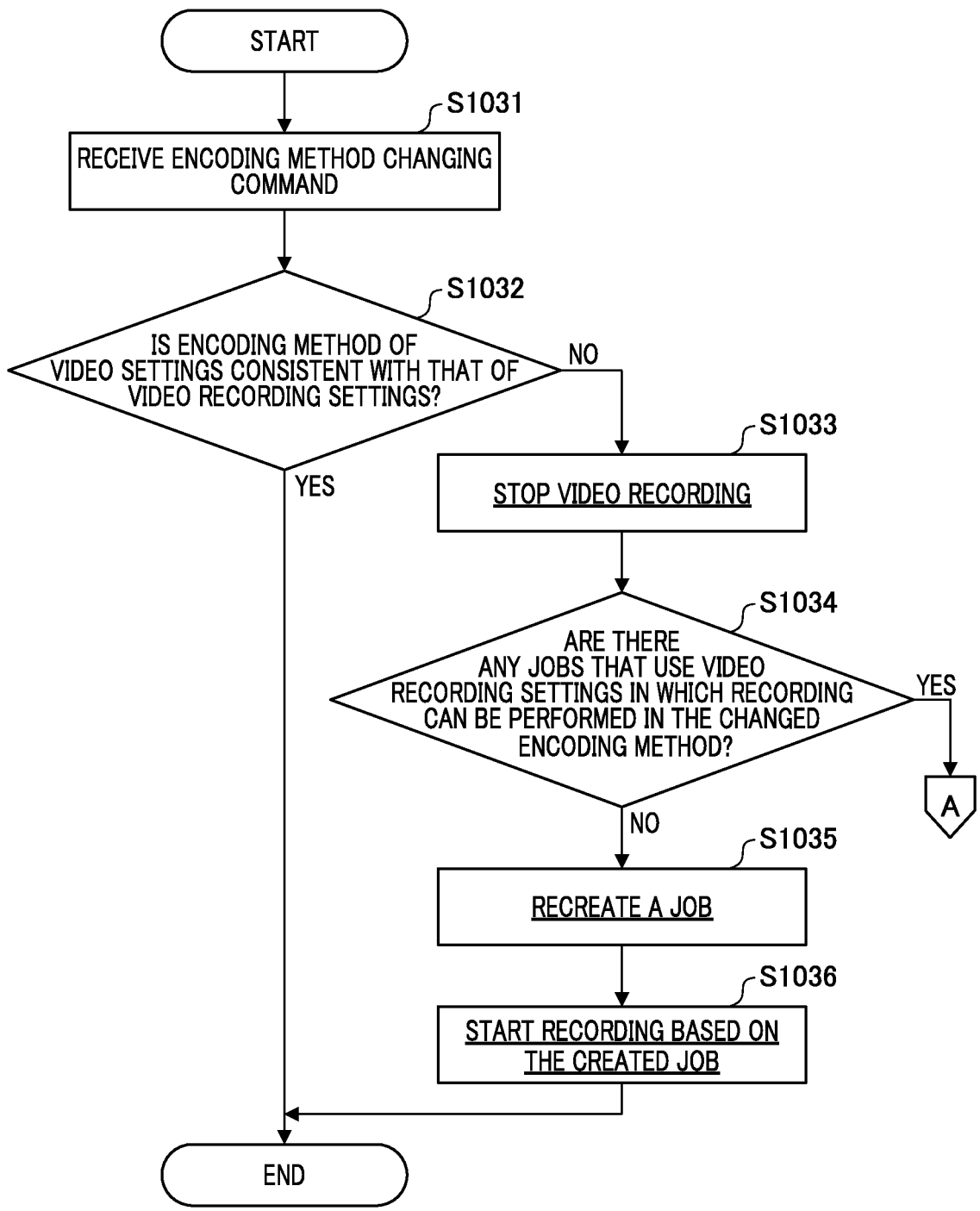
FIG. 10 is a flowchart showing a part of the video recording state changing processing according to the third embodiment of the present invention.
Figure 11:
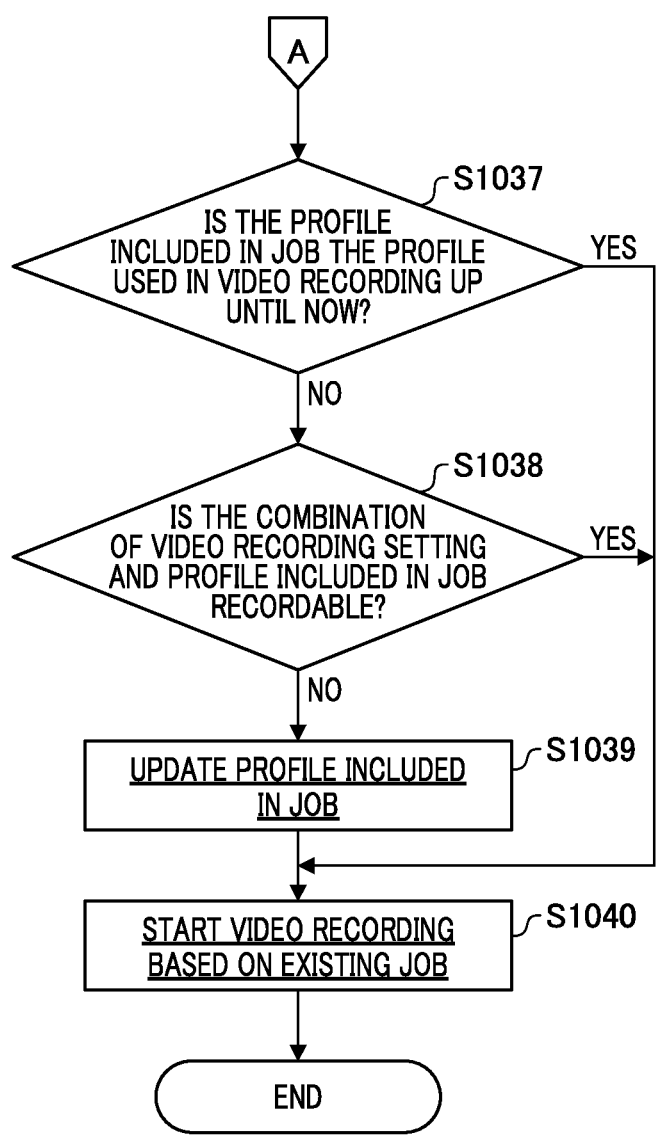
FIG. 11 is a flowchart showing the processing following the processing in FIG. 10.

FIG. 10 is a flowchart showing the video recording state changing processing according to the third embodiment of the present invention and FIG. 11 is a flowchart showing the processing following the processing in FIG. 10. FIGS. 12 to 14 are diagrams for respectively explaining first to third examples of the existing second RecordingJob and its profile.

Step S1031 is a process for receiving a change request for the video settings by the SetVideoEncoderConfiguration command (encoding method changing command). In this context, the video settings indicate settings that are related to, for example, the encoding system, frame rate, and quality of the video image. In the example below, a case in which a change request for changing the video setting for the encoding method from H.264 to H.265 is received will be described.

Upon receiving the change request, in step S1031, the contents of the change that is included in the change request are applied to the Profile (video settings) that is being used for the current video recording, and the Profile (video settings) is changed.

For example, if the change request is a request for changing the encoding method from H.264 to H.265, the encoding method of the Profile (video settings) that is being used for the current recording of the video image is changed from H.264 to H.265. The contents of the change for such a change request will result in the current recording job failing to record video data.

The process proceeds to step S1032, and whether or not there is a difference (an inconsistency occurs) in the encoded information (encoding method) between the RecordingConfiguration (video recording setting) corresponding to the RecordingJob (recording job) that is currently performing the video recording and the changed Profile (video settings) is determined.

When there is no difference (no inconsistency occurs) ("YES" in S1032), the process ends, and if there is a difference (inconsistency occurs) ("NO" in S1032), the process proceeds to step S1033.

Figure 12A:
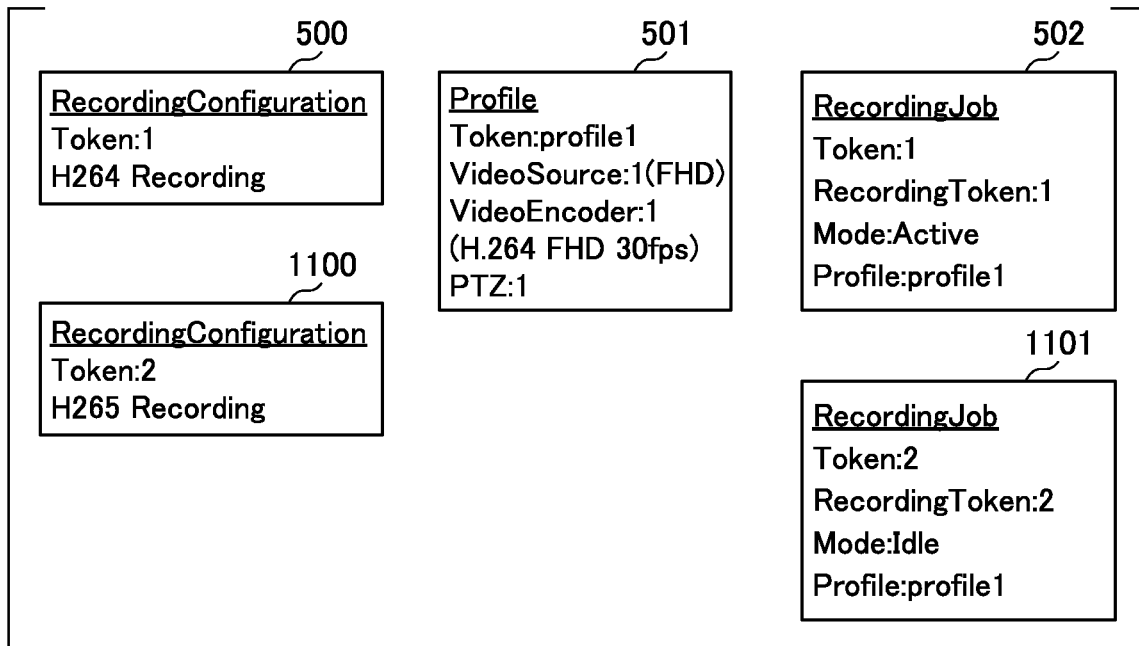
FIGS. 12A and 12B are diagrams for explaining a first example of an existing second recording job and its profile.
Figure 12B:
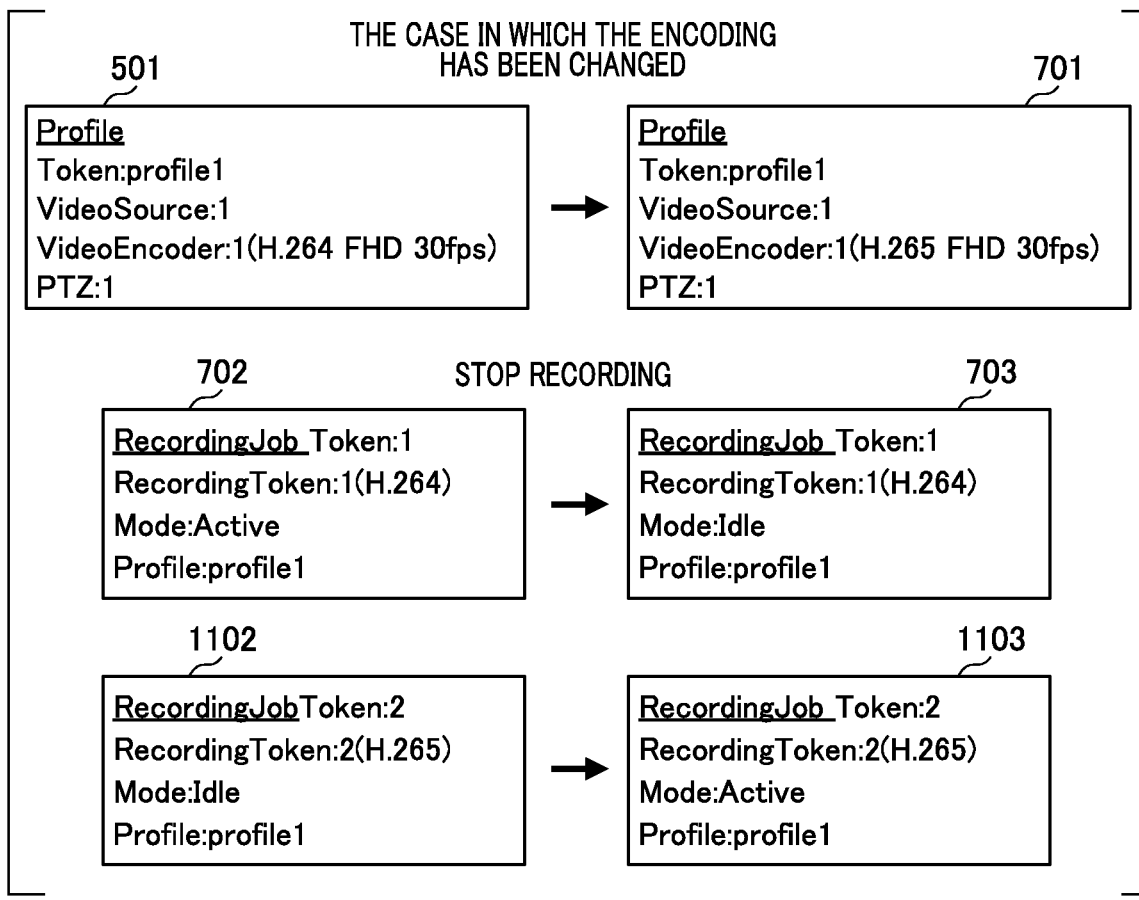
Figure 13A:
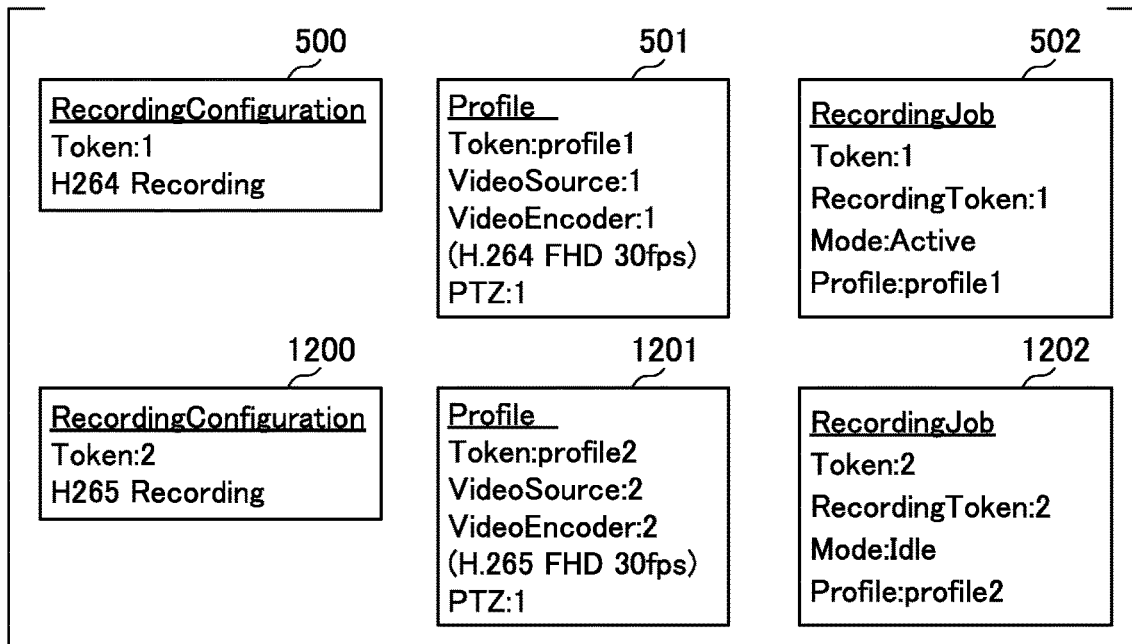
FIGS. 13A and 13B are diagrams for explaining a second example of an existing second recording job and its profile.
Figure 13B:
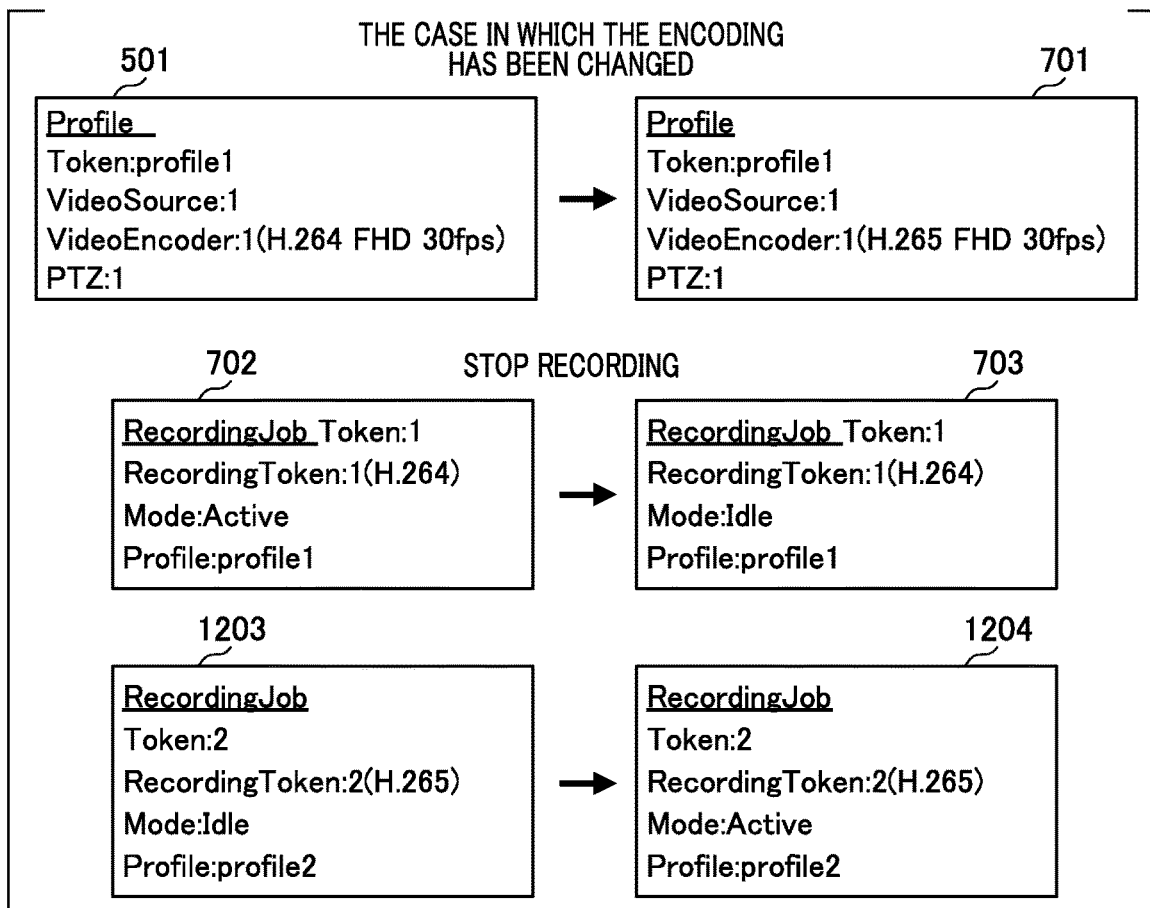
Figure 14A:
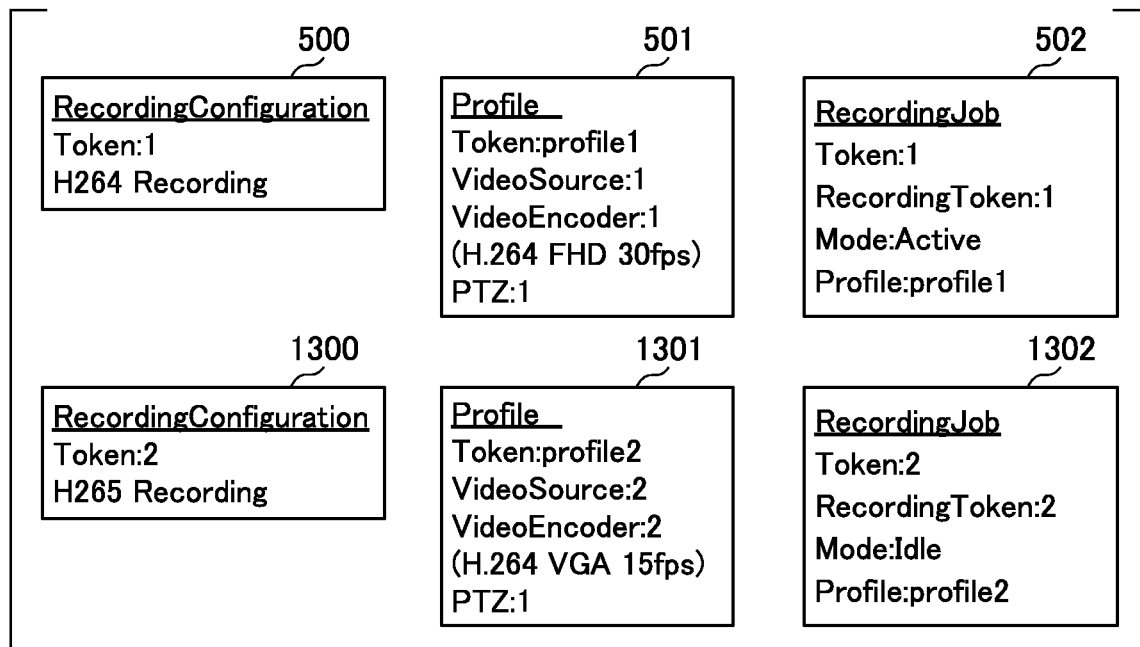
FIGS. 14A and 14B are diagrams for explaining a third example of an existing second recording job and its profile.
Figure 14B:
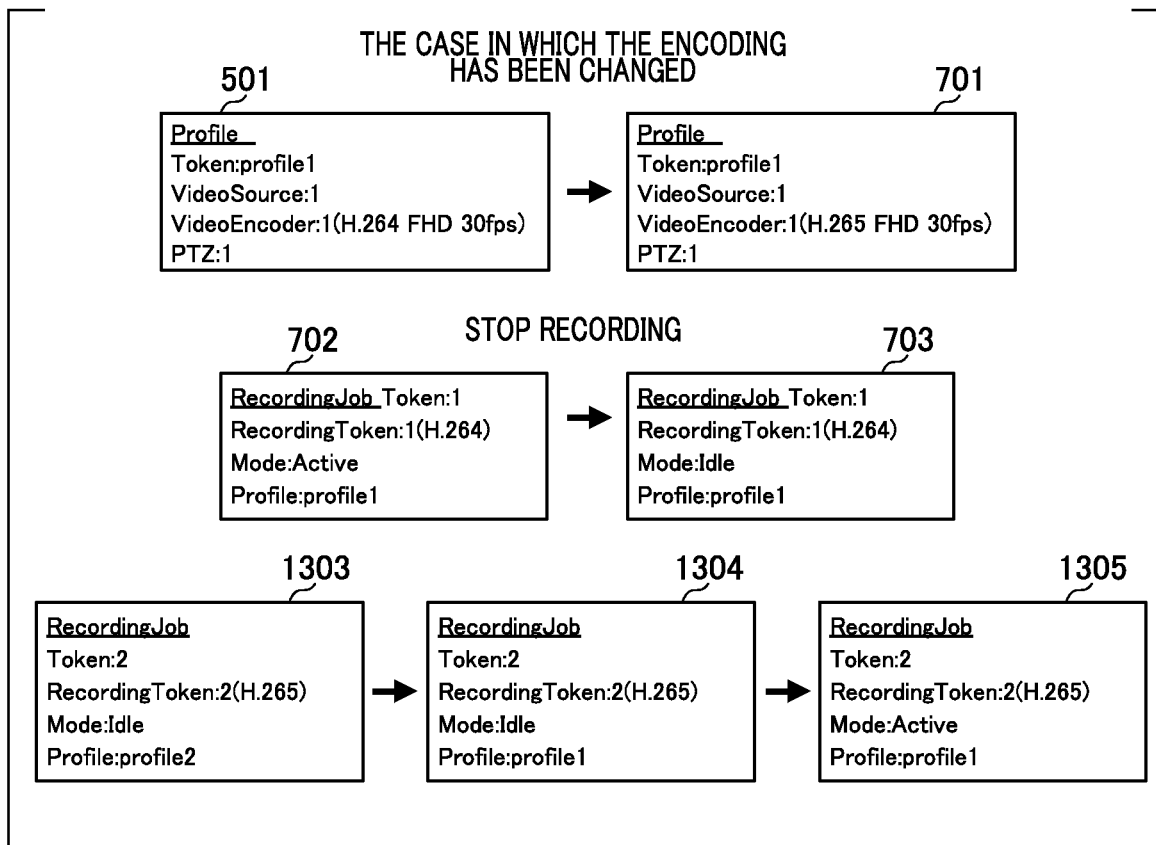

Accordingly, for example, in FIG. 12B, FIG. 13B, and FIG. 14B, a video setting change is performed according to the change request shown in 701 in FIG. 7 and FIG. 9. Subsequently, if an inconsistency occurs between the RecordingConfiguration and the Profile, the process proceeds to step S1033, and the process for stopping the video recording is performed.

Specifically, in FIG. 12B, FIG. 13B, and FIG. 14B, the Mode that is included in the first recording job (RecordingJob) is changed from Active to Idle as in 702 and 703 in FIG. 7 and FIG. 9.

Step S1034 is a process for searching for and determining whether or not an existing second recording job (RecordingJob) that uses video recording settings in which recording can be performed in the encoding method after the change is stored in, for example, the storage unit 1002.

For example, if a RecordingJob that includes a RecordingConfiguration in which recording can be performed in the format of H.265 has already been stored in the storage unit as shown in 1101 in FIG. 12A, 1202 in FIG. 13A, and 1302 in FIG. 14A, the process proceeds to step S1037 in FIG. 11.

If a RecordingJob that includes a RecordingConfiguration in which recording can be performed in the encoding method of H.265 has not been stored in the storage unit ("NO" in step 1034), the process proceeds to step S1035.

Subsequently, a RecordingJob in which recording can be performed in the encoding method for which the change request was made is created again, and, in step 1036, the video recording by the created RecordingJob starts.

That is, if a second recording job that corresponds to video recording settings that are consistent with the video settings that have been changed in response to the change request has not been stored, a second recording job is created. In contrast, when a second recording job has been stored, the recording of the video data is performed by using the second recording job that has been stored.

Since the process for recreating the RecordingJob (step S1035) and the process for starting recording (step S1036) are respectively the same as those in steps S1012 and S1013 in the first embodiment, descriptions thereof will be omitted.

Step S1037 in FIG. 11 is a process for determining whether or not the Profile that is included in the second recording job that was searched for in step S1034 has been used in the video recording until immediately before the stopping of the recording in step S1033.

For example, as shown in 1101 in FIG. 12A, if a second recording job that includes a RecordingToken, and which can be recorded in H.265, includes the Profile 501 that has been used until immediately before the stopping of the recording, the process proceeds to step S1040, and video recording starts based on the information that is included in the second recording job (RecordingJob).

In this context, since, in step S1031, the encoding method is changed from H.264 to H.265, the "Profile 501 that was used until immediately before the stopping of the recording" indicates a state in which the encoding methods are consistent with each other.

Specifically, in step S1040 the Mode that is included in the second recording job (RecordingJob) is changed from Idle to Active as shown in 1102 and 1103 in FIG. 12B.

That is, the video recording starts by using the existing second recording job 1101 (1102). Specifically, if the video settings that are included in the second recording job that has been stored are the same as the video settings that have been changed in response to the change request, the recording of video data is performed by using the second recording job that has been stored, instead of creating a new second recording job.

In contrast, it is assumed that a second Profile, which is different from the Profile that was used immediately before the stopping of recording, is included in the existing second recording job that was searched for in step S1034, as shown in 1202 in FIG. 13A and 1302 in FIG. 14A. In that case, the determination result is "NO" in step S1037, and the process proceeds to step S1038.

In step S1038, whether or not the encoding method of the Profile that is included in the second recording job that was searched for in step S1034 matches the encoding method by which recording can be performed in the RecordingConfiguration that is included in the second recording job is determined.

For example, it is assumed that a second Profile such as that in 1201 is included in the second recording job (RecordingJob) in which a RecordingConfiguration that can be recorded in H.265 is included, as shown in 1202 in FIG. 13A. This second Profile is different from the Profile 501 that was used immediately before the stopping of recording.

However, since the encoding method for this second Profile 1201 is H.265, in step S1038, it is determined that the combination with the second recording job (RecordingJob) is recordable.

Accordingly, the process proceeds to step S1040, and video recording starts based on the information that is included in the second recording job (RecordingJob), which is the existing job. Specifically, the Mode that is included in the second recording job (RecordingJob) is changed from Idle to Active, as shown in 1203 and 1204 in FIG. 13B.

Specifically, when the video setting that is included in the second recording job that has been stored is a video setting that is different from the changed video setting and is consistent with the video recording setting, the recording of the video data is performed based on the second recording job that has been stored.

In contrast, a case in which a second Profile such as that in 1301 is included in a second recording job (RecordingJob) in which a RecordingConfiguration that can be recorded in H.265 is included is assumed, as shown in 1402 in FIG. 14A. In this case, the encoding method for the second Profile is not H.265, the determination result is "NO" in step 1038, and the process proceeds to step 1039.

Subsequently, in step S1039, the Profile (1301) that is included in the second recording job (RecordingJob) is changed to the Profile (501), in which the encoding method is H.265 (S1039), as shown in 1303 and 1304 in FIG. 14B, and the Profile is updated.

In FIG. 14A, although the encoding method for the Profile 501 is H.264, the encoding method is changed from H.264 to H.265 upon receiving the encoding method changing command in step 1031, and the encoding method is thereby H.265 at the time point in step S1039.

Accordingly, the encoding method of the Profile that is included in the second recording job (RecordingJob) 1304 in FIG. 14B is H.265.

Subsequently, the process proceeds to step S1040, where the Mode that is included in the second recording job (RecordingJob) is changed from Idle to Active as shown in 1304 and 1305 in FIG. 14B, and the video recording starts.

Specifically, if the video settings that are included in the second recording job are video settings that are different from the changed video settings and are not consistent with the video recording settings, the recording of the video data based on the second recording job is performed in combination with video settings that are consistent with the video recording settings.

The video recording continuing method for when a video setting is changed according to the third embodiment has been described with reference to FIGS. 10 to 14.

As described above, in the third embodiment, in a case in which an inconsistency occurs in the recording settings due to a change in the video settings, whether or not recording can be performed by the created recording job is determined, and when the recording can be performed, video recording is performed by using the created second recording job. If the recording cannot be performed even though the recording job has been created, video recording starts after changing the settings, and if the recording job has not been created, the recording job is created, and video recording starts.

Specifically, in the third embodiment, a search for whether or not a second recording job that corresponds to the video settings that have been changed based on the change request, which is different from the first recording job, has been stored is performed based on the change request received by the receiving unit, and if the second recording job has been stored, the recording of video data is performed by using the result of the search.

Consequently, it is possible to continue recording even if a video setting change that causes an inconsistency is performed. In a case in which a plurality of recording jobs has already been created, it is possible to continue recording by using the existing recording jobs.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. In addition, as a part or the whole of the control according to this embodiment, a computer program realizing the function of the embodiment described above may be supplied to the image pickup signal processing apparatus through a network or various storage media. Then, a computer (or a CPU, an MPU, or the like) of the image pickup signal processing apparatus may be configured to read and execute the program. In such a case, the program and the storage medium storing the program configure the present invention.

This application claims the benefits of Japanese Patent Application No. 2021-111625 filed on Jul. 5, 2021, and Japanese Patent Application No. 2021-192826 filed on Nov. 29, 2021, both of which are hereby incorporated by reference herein in their entirety.

What is claimed is:

1. An image signal processing apparatus comprising:
one or more processors; and
a memory storing instructions that, when executed by the one or more processors, cause the one or more processors to:
process an image signal acquired from an image pickup unit based on a predetermined video setting to generate video data;
perform recording of the video data by a first recording job that corresponds to the video setting and a video recording setting; and
receive a change request to change the video setting,
wherein, in response to the change request, the recording of the video data is performed by using a second recording job that corresponds to a video setting based on the change request, the second recording job being different from the first recording job, and wherein, in a case where a recording job which is consistent with the video setting based on the change request has not been stored, the second recording job is created, and in a case where the recording job which is consistent with the video setting based on the change request has been stored, the recording of the video data is performed by using the stored recording job as the second recoding job.

2. The image signal processing apparatus according to claim 1, wherein the change request includes a request to change an encoding method included in the video setting to another encoding method.

3. The image signal processing apparatus according to claim 1, wherein the video setting includes a setting related to at least one of an encoding method, a frame rate, and a resolution.

4. The image signal processing apparatus according to claim 1, wherein the video setting is set by using a VideoEncoderConfiguration of a Profile conforming to the ONVIF standard.

5. The image signal processing apparatus according to claim 1, wherein the video recording setting includes a description related to an encoding method that can be used in video recording.

6. The image signal processing apparatus according to claim 1, wherein the video recording setting is set by using a RecordingConfiguration conforming to the ONVIF standard.

7. The image signal processing apparatus according to claim 1, wherein the first recording job and the second recording job are RecordingJobs conforming to the ONVIF standard.

8. The image signal processing apparatus according to claim 1, wherein the recording of the video data by using the second recording job after stopping the recording based on the first recording job is performed.

9. The image signal processing apparatus according to claim 1, wherein the control unit creates the second recording job before stopping the recording based on the first recording job is created.

10. The image signal processing apparatus according to claim 1, wherein the second recording job by associating the video setting based on the change request with the video recording setting that is consistent with the video setting based on the change request is created.

11. The image signal processing apparatus according to claim 1, wherein the second recording job is created by associating a second video setting that is changed from a first video setting in response to the change request with the video recording setting that is consistent with the second video setting.

12. The image signal processing apparatus according to claim 1, wherein in a case where the second recording job that corresponds to the video recording setting that is consistent with the video setting based on the change request has been stored and the video setting that is included in the second recording job that has been stored is the same as the video setting that has been changed based on the change request, the recording of the video data by using the second recording job that has been stored instead of creating a new second recording job is performed.

13. The image signal processing apparatus according to claim 12, wherein in a case where the second recording job that corresponds to the video recording setting that is consistent with the video setting based on the change request has been stored, the video setting included in the second recording job that has been stored is different from the video setting based on the change request and is consistent with the video recording setting, the recording of the video data based on the second recording job that has been stored instead of creating a new second recording job is performed.

14. The image signal processing apparatus according to claim 1, wherein in a case where the second recording job that corresponds to the video recording setting that is consistent with the video setting in to the change request has been stored and in a case where the video setting that is included in the second recording job is different from the video setting based on the change request and is not consistent with the video recording setting, the recording of the video data based on the second recording job is performed by combination with the video setting that is consistent with the video recording setting.

15. The image signal processing apparatus according to claim 1 further including at least one processor or circuit configured to function as:
create a recording job in association with the video setting and the video recording setting,
wherein in a case the change request for the video setting is performed during the recording of the video data based on the first recording job that has been created and the recording cannot be continued due to an inconsistency between the video recording setting in the first recording job and the video setting based on the change request, a second recording job that is different from the first recording job is created to continues the recording.

16. An image signal processing method comprising:
processing an image signal acquired from an image pickup unit based on a predetermined video setting to generate video data;
recording of the video data by a first recording job that corresponds to the video setting and a video recording setting; and
receiving a change request to change the video setting, wherein, in response to the change request, the recording of the video data is performed by using a second recording job that corresponds to a video setting based on the change request, the second recording job being is different from the first recording job, and
wherein, in a case where a recording job which is consistent with the video setting based on the change request has not been stored, the second recording job is created, and in a case where the recording job which is consistent with the video setting based on the change request has been stored, the recording of the video data is performed by using the stored recording job as the second recoding job.

17. A non-transitory computer-readable storage medium configured to store a computer program comprising instructions for executing the following processes:
processing an image signal acquired from an image pickup unit based on a predetermined video setting to generate video data;
recording of the video data by a first recording job that corresponds to the video setting and a video recording setting; and
receiving a change request to change the video setting, wherein, in response to the change request, the recording of the video data is performed by using a second recording job that corresponds to a video setting based on the change request, the second recording job being is different from the first recording job, and wherein, in a case where a recording job which is consistent with the video setting based on the change request has not been stored, the second recording job is created, and in a case where the recording job which is consistent with the video setting based on the change request has been stored, the recording of the video data is performed by using the stored recording job as the second recoding job.

* * * * *